United States Patent
Smith et al.

(10) Patent No.: US 9,494,201 B2
(45) Date of Patent: Nov. 15, 2016

(54) DOUBLE CLUTCH WITH NESTED LEVERS

(71) Applicant: Schaeffler Technologies AG & Co. KG, Herzogenaurach (DE)

(72) Inventors: David Smith, Wadsworth, OH (US); Alfredo Jimenez Perez Mitre, Wooster, OH (US); Kenneth Hunt, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/688,422

(22) Filed: Apr. 16, 2015

(65) Prior Publication Data
US 2015/0308515 A1    Oct. 29, 2015

Related U.S. Application Data

(60) Provisional application No. 61/983,176, filed on Apr. 23, 2014.

(51) Int. Cl.
| | |
|---|---|
| *F16D 23/12* | (2006.01) |
| *F16D 21/00* | (2006.01) |
| *F16D 21/06* | (2006.01) |
| *F16D 25/08* | (2006.01) |

(52) U.S. Cl.
CPC .............. *F16D 23/12* (2013.01); *F16D 21/00* (2013.01); *F16D 21/06* (2013.01); *F16D 25/087* (2013.01); *F16D 2021/0669* (2013.01)

(58) Field of Classification Search
CPC ........................ F16D 2023/126; F16D 13/385
USPC .................................................... 192/48.603
See application file for complete search history.

(56) References Cited

U.S. PATENT DOCUMENTS

| | | | | |
|---|---|---|---|---|
| 4,662,497 A | * | 5/1987 | Cucinotta | F16D 13/385 192/70.18 |
| 5,358,085 A | * | 10/1994 | Flotow | F16D 13/385 192/111.16 |
| 7,493,997 B2 | * | 2/2009 | Meinhard | B60K 23/02 192/115 |
| 2003/0168302 A1 | | 9/2003 | Diemer et al. | |
| 2010/0140036 A1 | * | 6/2010 | Ross | F16D 13/385 192/48.7 |
| 2011/0094845 A1 | * | 4/2011 | Hogberg | F16D 21/06 192/48.61 |
| 2011/0139565 A1 | * | 6/2011 | Acker | F16D 21/06 192/48.601 |
| 2011/0214532 A1 | | 9/2011 | Kirchner | |
| 2011/0297501 A1 | * | 12/2011 | Hoppe | F16D 21/06 192/48.9 |
| 2012/0175213 A1 | * | 7/2012 | Burkhart | F16D 25/08 192/48.601 |
| 2012/0222512 A1 | | 9/2012 | Renard et al. | |
| 2013/0025995 A1 | | 1/2013 | Krebs et al. | |

FOREIGN PATENT DOCUMENTS

EP     1686275     8/2006

* cited by examiner

*Primary Examiner* — Robert Hodge
*Assistant Examiner* — Stacey Fluhart
(74) *Attorney, Agent, or Firm* — Simpson & Simpson PLLC

(57) ABSTRACT

A double clutch, including: a backing plate; a first clutch including at least one first clutch plate, a first pressure plate, a first plurality of levers engaged with the first pressure plate, a first shim engaged with the first plurality of levers, and a first actuator engaged with the first shim and arranged to axially displace the first shim to close the first clutch; and a second clutch including: at least one second clutch plate, a second pressure plate, a second plurality of levers engaged with the second pressure plate aligned with the first plurality of levers such that a first line in the circumferential direction passes through the first and second pluralities of levers, a second shim engaged with the second plurality of levers, and a second actuator engaged with the second shim and arranged to axially displace the second shim to close the second clutch.

18 Claims, 9 Drawing Sheets

US 9,494,201 B2

DOUBLE CLUTCH WITH NESTED LEVERS

CROSS-REFERENCE TO RELATED APPLICATIONS

This application claims the benefit under 35 U.S.C. §119(e) of U.S. Provisional Patent Application No. 61/983,176, filed Apr. 23, 2014, which application is incorporated herein by reference in its entirety.

TECHNICAL FIELD

The present disclosure relates to a double clutch with circumferentially aligned and axially nested levers and shims, reducing axial space required for the double clutch.

BACKGROUND

FIG. 9 is taken from FIG. 1 of EP 1 686 275 and shows known double clutch 200. Reduction of axial space for a double clutch is a crucial design consideration. Double clutch 200 in FIG. 9 attempts to reduce axial space requirements by radially aligning clutches 202 and 204. However, as the diameter of clutch plates is reduced, the torque bearing capacity of the clutch is reduced. Thus, to account for the loss of torque bearing capacity resulting from the radially inward location of clutch 204, two clutch plates 206 and ancillary components are necessary. The additional clutch plate and components take up axial space, reducing the advantage gained by radially stacking clutch 202 and 204. In addition, levers 208 and 210 must be independently rotatable and actuatable. Therefore, circumferential overlapping of the levers must be avoided.

SUMMARY

According to aspects illustrated herein, there is provided a double clutch, including: a backing plate; a first clutch including at least one first clutch plate, a first pressure plate, a first plurality of levers engaged with the first pressure plate, a first shim engaged with the first plurality of levers, and a first actuator engaged with the first shim and arranged to axially displace the first shim to close the first clutch; and a second clutch including: at least one second clutch plate, a second pressure plate, a second plurality of levers engaged with the second pressure plate aligned with the first plurality of levers such that a first line in the circumferential direction passes through the first and second pluralities of levers, a second shim engaged with the second plurality of levers, and a second actuator engaged with the second shim and arranged to axially displace the second shim to close the second clutch.

According to aspects illustrated herein, there is provided a double clutch, including: a backing plate; a first clutch including: at least one first clutch plate, a first pressure plate, a first plurality of levers engaged with the first pressure plate, a first shim engaged with the first plurality of levers and including a plurality of openings passing through material forming the first shim, and a first actuator engaged with the first shim and arranged to axially displace the first shim to close the first clutch; and a second clutch including: at least one second clutch plate, a second pressure plate, a second plurality of levers engaged with the second pressure plate, a second shim engaged with the second plurality of levers, and a second actuator engaged with the second shim and arranged to axially displace the second shim to close the second clutch. For a closed position of the first clutch: he first pressure plate, at least one first clutch plate, and backing plate are non-rotatably connected; and respective portions of the first and second pluralities of levers are aligned such that a first line in a circumferential direction passes through the respective portions of the first and second shims.

According to aspects illustrated herein, there is provided a double clutch, including: a backing plate; a first clutch including: at least one first clutch plate, a first pressure plate, a first plurality of levers engaged with the first pressure plate, a first shim engaged with the first plurality of levers and including a plurality of openings passing through material forming the first shim, and a first actuator engaged with the first shim and arranged to displace the first shim in a first axial direction to close the first clutch; and a second clutch including: at least one second clutch plate, a second pressure plate, a second lever engaged with the second pressure plate and aligned with the first plurality of levers such that a first line in a circumferential direction passes through the first and second pluralities of levers, a second shim engaged with the second lever and including a plurality of portions, and a second actuator engaged with the second shim and arranged to displace the second shim in the axial direction to close the second clutch. For a closed position of the first clutch: the first pressure plate, the at least one first clutch plate, and the backing plate are non-rotatably connected; and the plurality of portions are disposed within the plurality of openings such that a second line in the circumferential direction passes through the plurality of portions and the plurality of openings.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
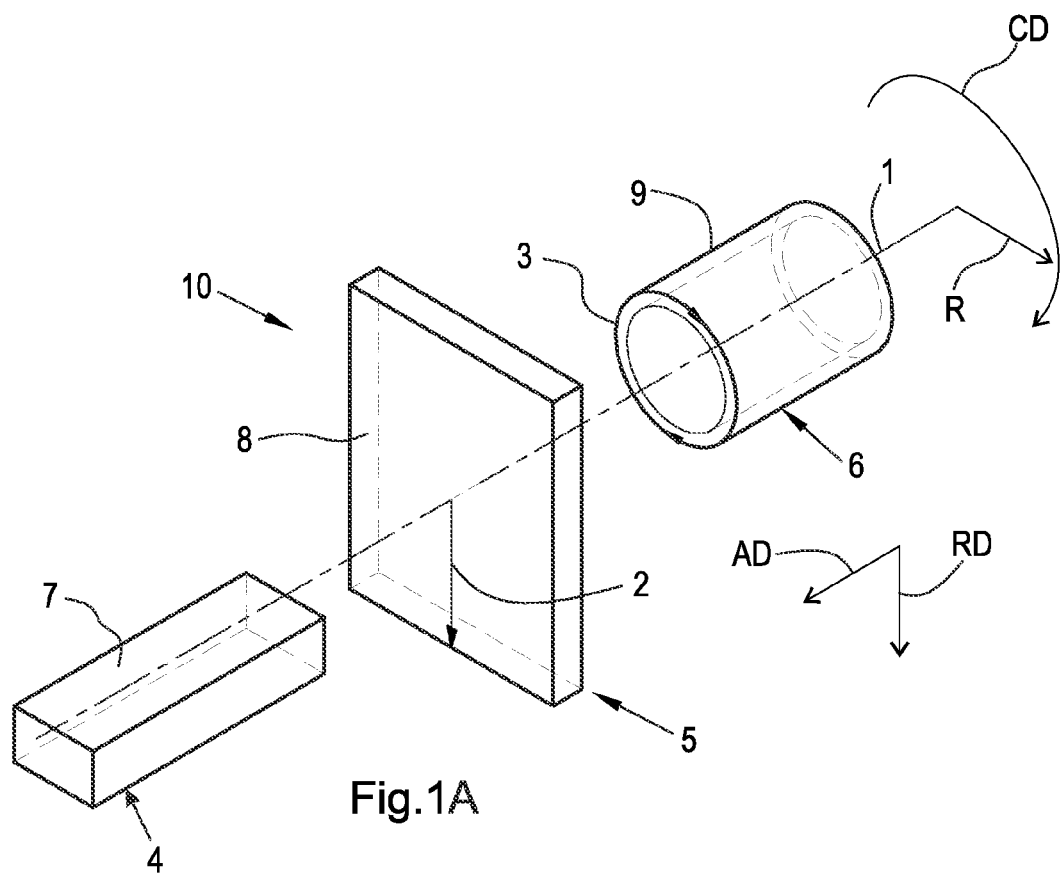
FIG. 1A is a perspective view of a cylindrical coordinate system demonstrating spatial terminology used in the present application.

FIG. 1A is a perspective view of cylindrical coordinate system 10 demonstrating spatial terminology used in the present patent. The present invention is at least partially described within the context of cylindrical coordinate system 10. System 10 has a longitudinal axis 1, used as the reference for the directional and spatial terms that follow. Axial direction AD is parallel to axis 1. Radial direction RD is orthogonal to axis 1. Circumferential direction CD is defined by an endpoint of radius R (orthogonal to axis 1) rotated about axis 1.

To clarify the spatial terminology, objects 4, 5, and 6 are used. Surface 7 of object 4 forms an axial plane. For example, axis 1 is congruent with surface 7. Surface 8 of object 5 forms a radial plane. For example, radius 2 is congruent with surface 8. Surface 9 of object 6 forms a circumferential surface. For example, circumference 3 is congruent with surface 9. As a further example, axial movement or disposition is parallel to axis 1; radial movement or disposition is orthogonal to axis 2, and circumferential movement or disposition is parallel to circumference 3. Rotation is described herein with respect to axis 1.

The adverbs "axially," "radially," and "circumferentially" are used with respect to an orientation parallel to axis 1, radius 2, or circumference 3, respectively. The adverbs "axially," "radially," and "circumferentially" are also used regarding orientation parallel to respective planes.

Figure 1B:
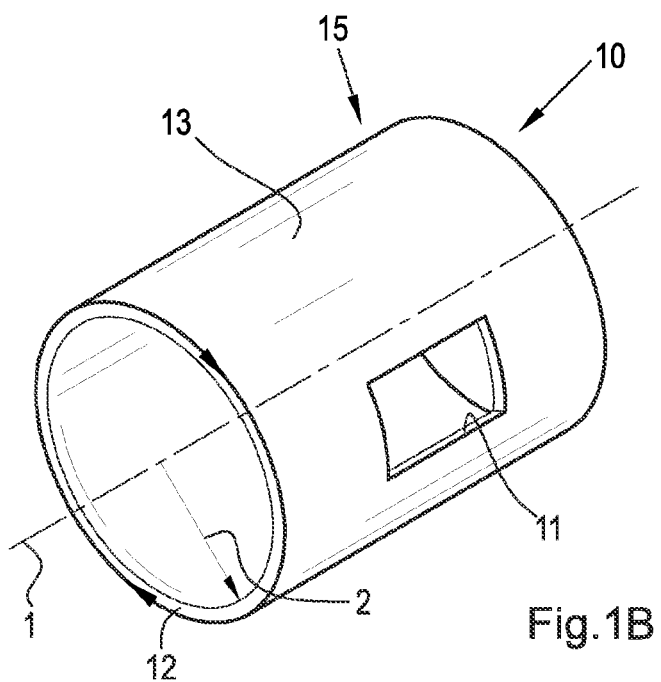
FIG. 1B is a perspective view of an object in the cylindrical coordinate system of FIG. 1A demonstrating spatial terminology used in the present application.

FIG. 1B is a perspective view of object 15 in cylindrical coordinate system 10 of FIG. 1A demonstrating spatial terminology used in the present patent. Cylindrical object 15 is representative of a cylindrical object in a cylindrical coordinate system and is not intended to limit the claims of the present invention in any manner. Object 15 includes axial surface 11, radial surface 12, and circumferential surface 13. Surface 11 is part of an axial plane, surface 12 is part of a radial plane, and surface 13 is part of a circumferential surface.

Figure 2:
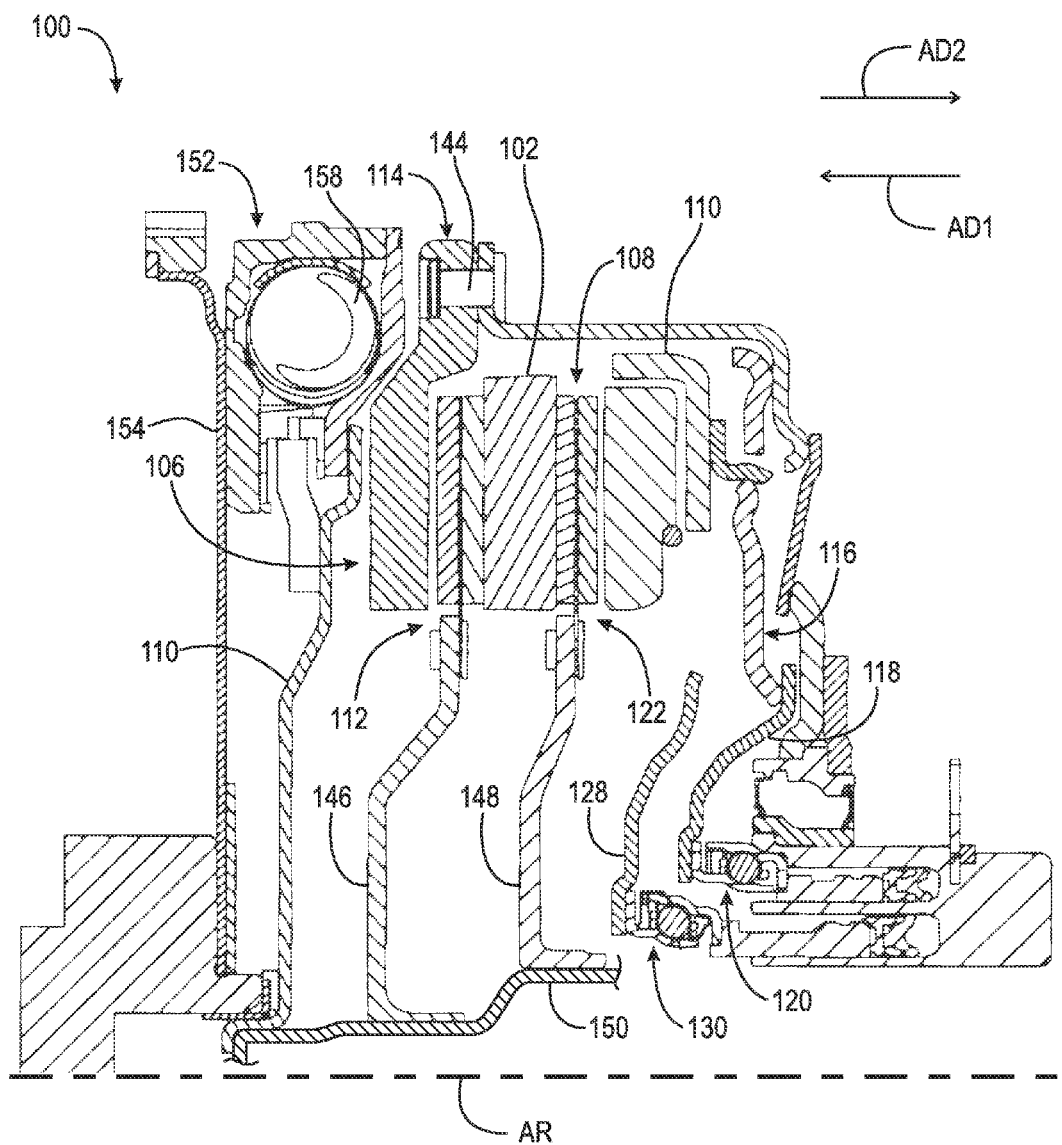
FIG. 2 is a partial cross-sectional view of a double clutch with interleaved shims.

FIG. 2 is a partial cross-sectional view of double clutch 100 with interleaved shims and levers.

Figure 3:
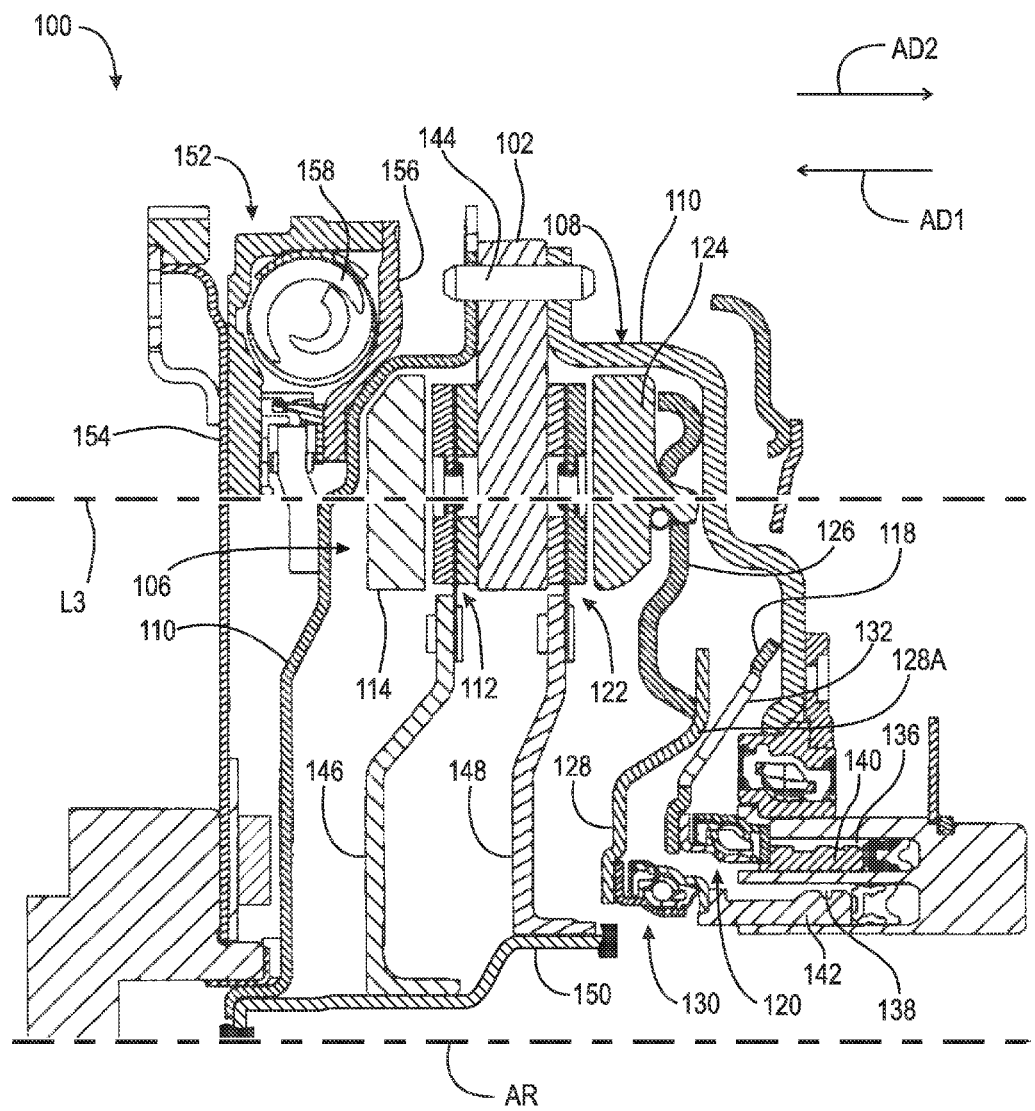
FIG. 3 is a partial cross-sectional view of the double clutch in FIG. 2.

FIG. 3 is a partial cross-sectional view of double clutch 100 in FIG. 2.

Figure 4:
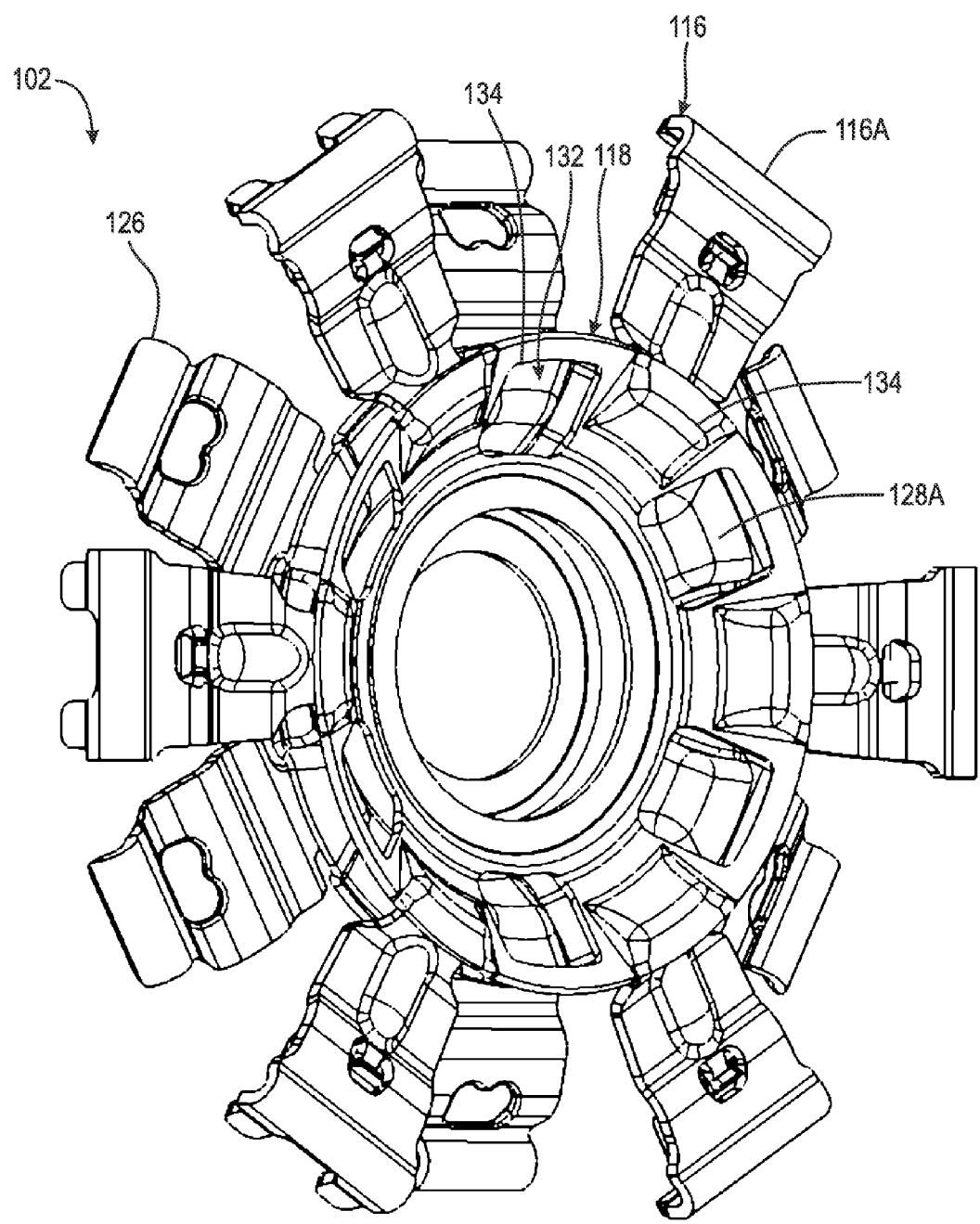
FIG. 4 a front perspective view of a shims and lever assembly usable in the double clutch in FIGS. 2 and 3.

FIG. 4 a front perspective view of shim and lever assembly 102 usable in double clutch 100 shown in FIGS. 2 and 3.

Figure 5:
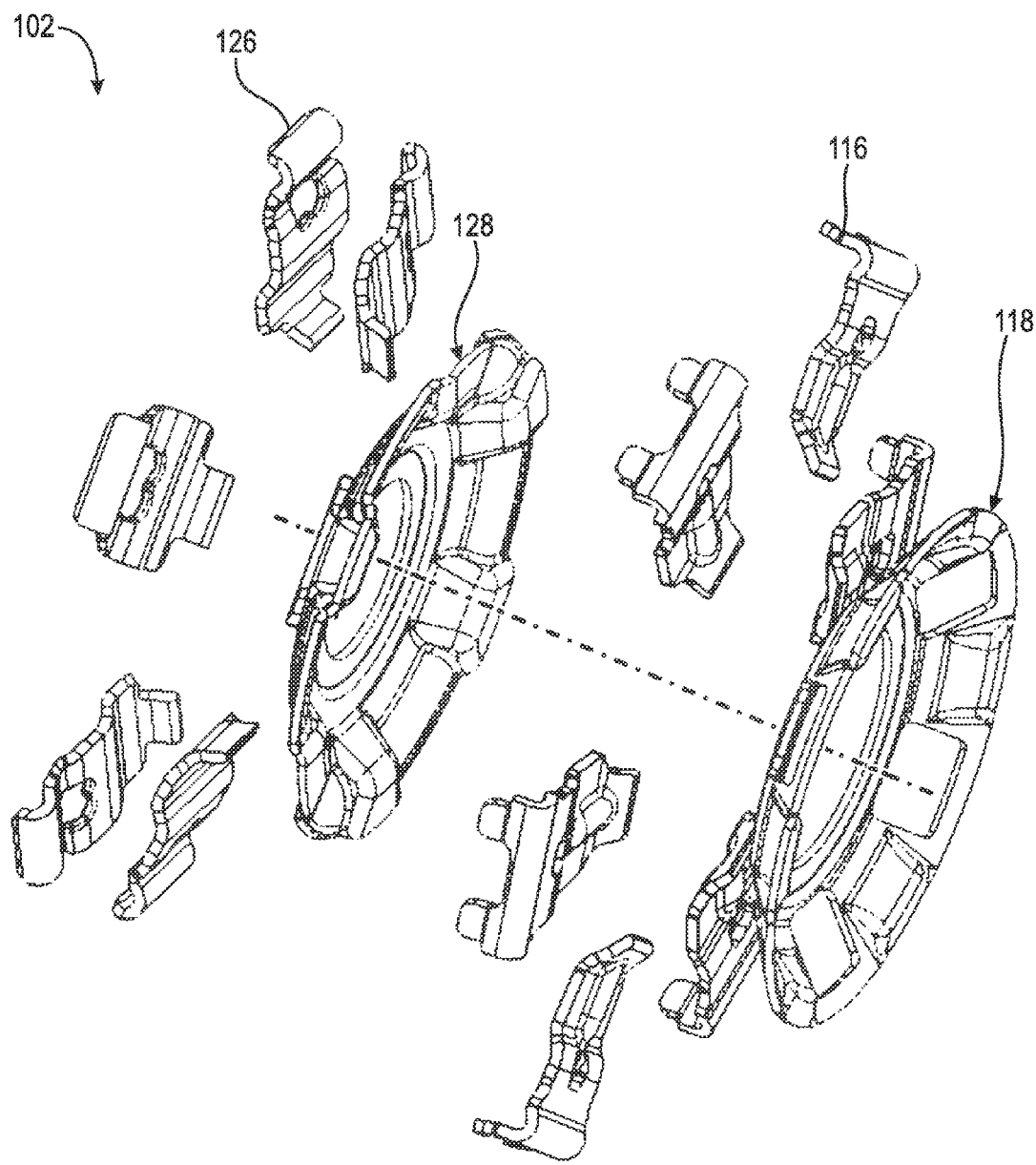
FIG. 5 is an exploded view of the shim and lever assembly shown in FIG. 4.

FIG. 5 is an exploded view of the shim and lever assembly 102 shown in FIG. 4. The following should be viewed in light of FIGS. 2 through 5. Clutch 100 includes axis of rotation AR, backing plate 102, clutches 106 and 108, and cover 110. Plate 102 is non-rotatably connected to cover 110. Clutch 106 includes one or more clutch plates 112, pressure plate 114, levers 116 engaged with pressure plate 114, shim 118 engaged with levers 116, and actuator 120. Actuator 120 is engaged with shim 118 and is arranged to axially displace shim 118 in axial direction AD1 to close clutch 106.

Clutch 108 includes one or more clutch plates 122, pressure plate 124, levers 126 engaged with pressure plate 124, shim 128 engaged with lever 126, and actuator 130. Actuator 130 is engaged with shim 128 and is arranged to axially displace shim 128 in axial direction AD1 to clutch 108.

Figure 6:
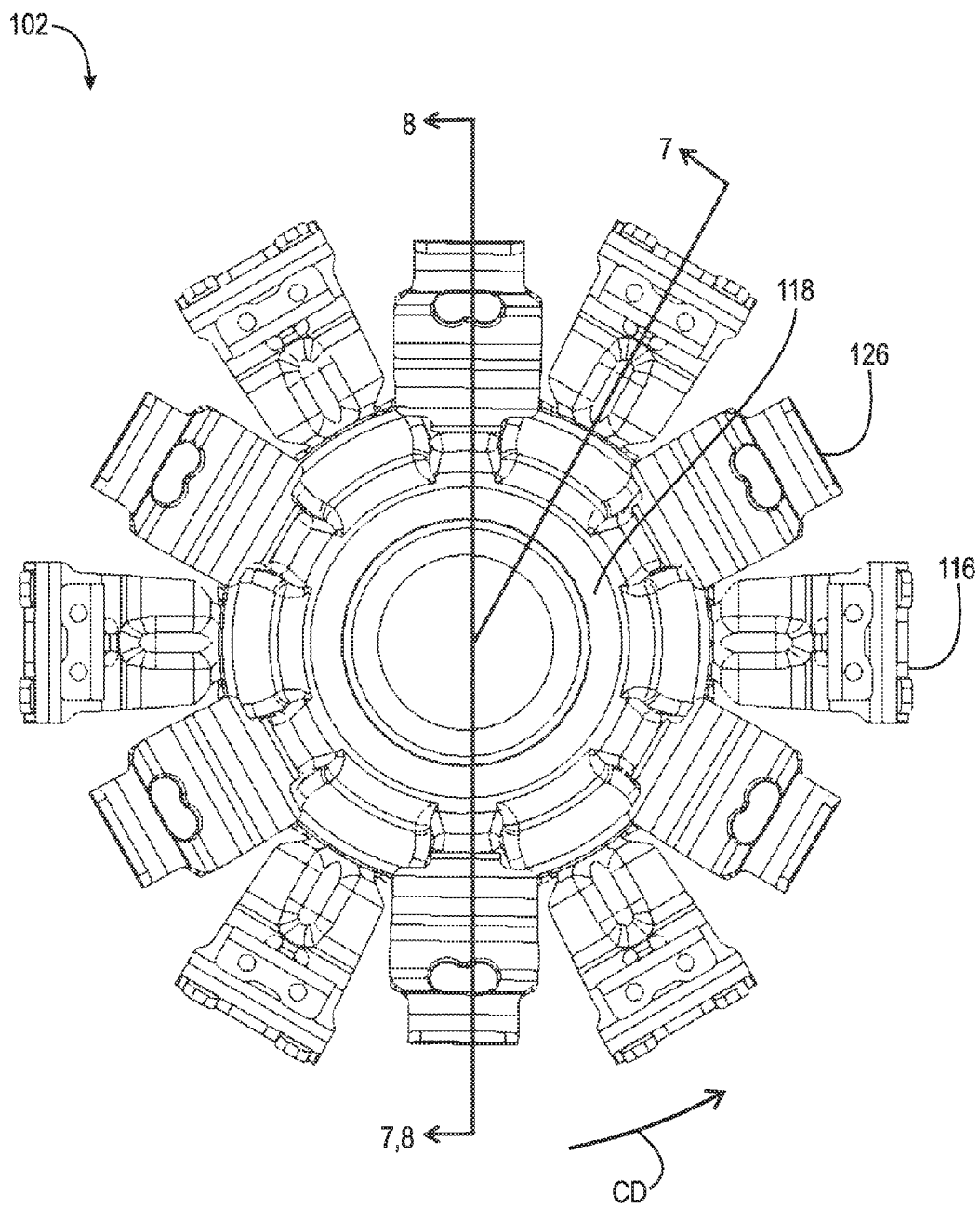
FIG. 6 is a front view of the shim and lever assembly shown in FIG. 4.

FIG. 6 is a front view of the shim and lever assembly shown in FIG. 4.

Figure 7:
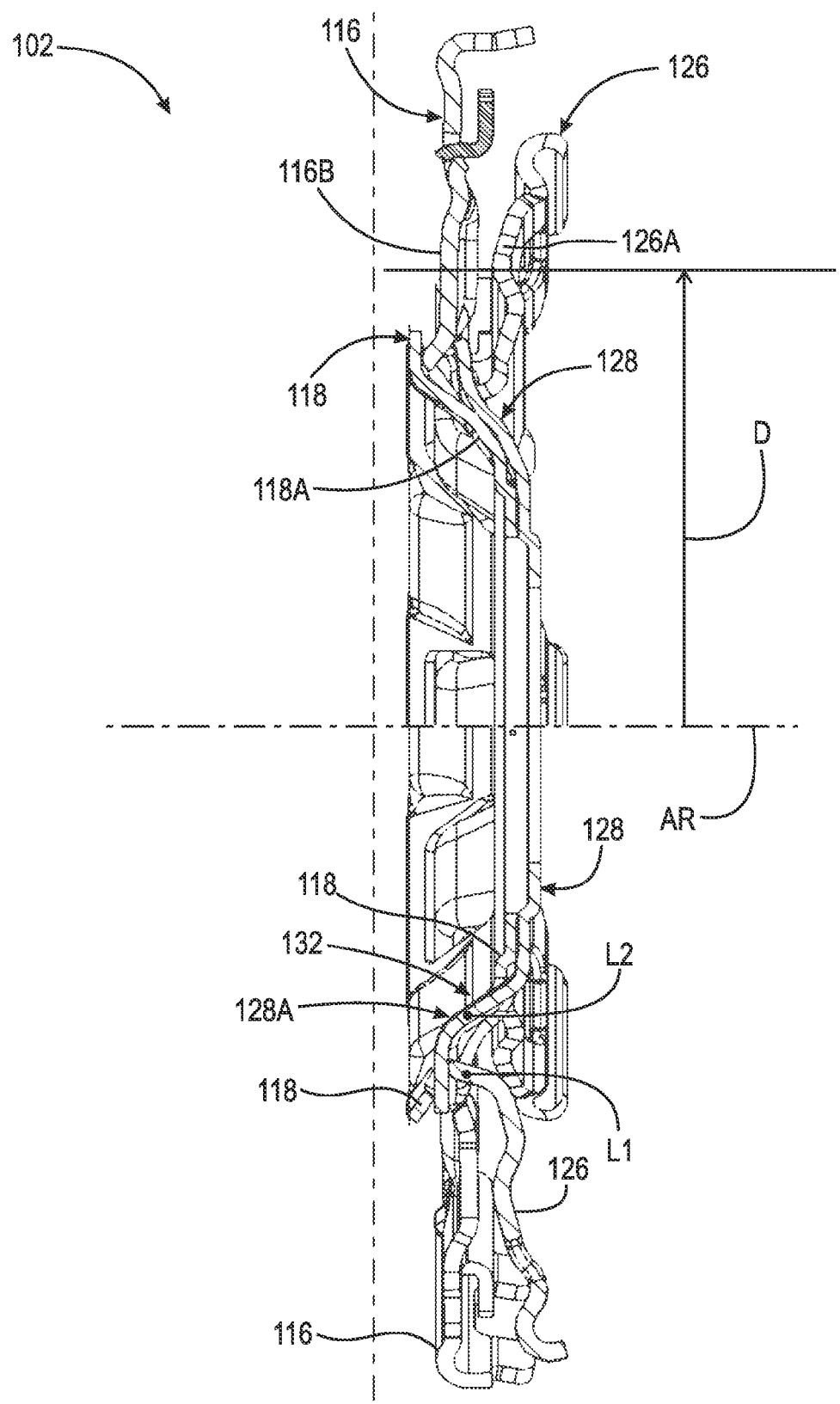
FIG. 7 is a cross-sectional view taken generally along line 7-7 in FIG. 6.

FIG. 7 is a cross-sectional view generally along line 7-7 in FIG. 6.

Figure 8:
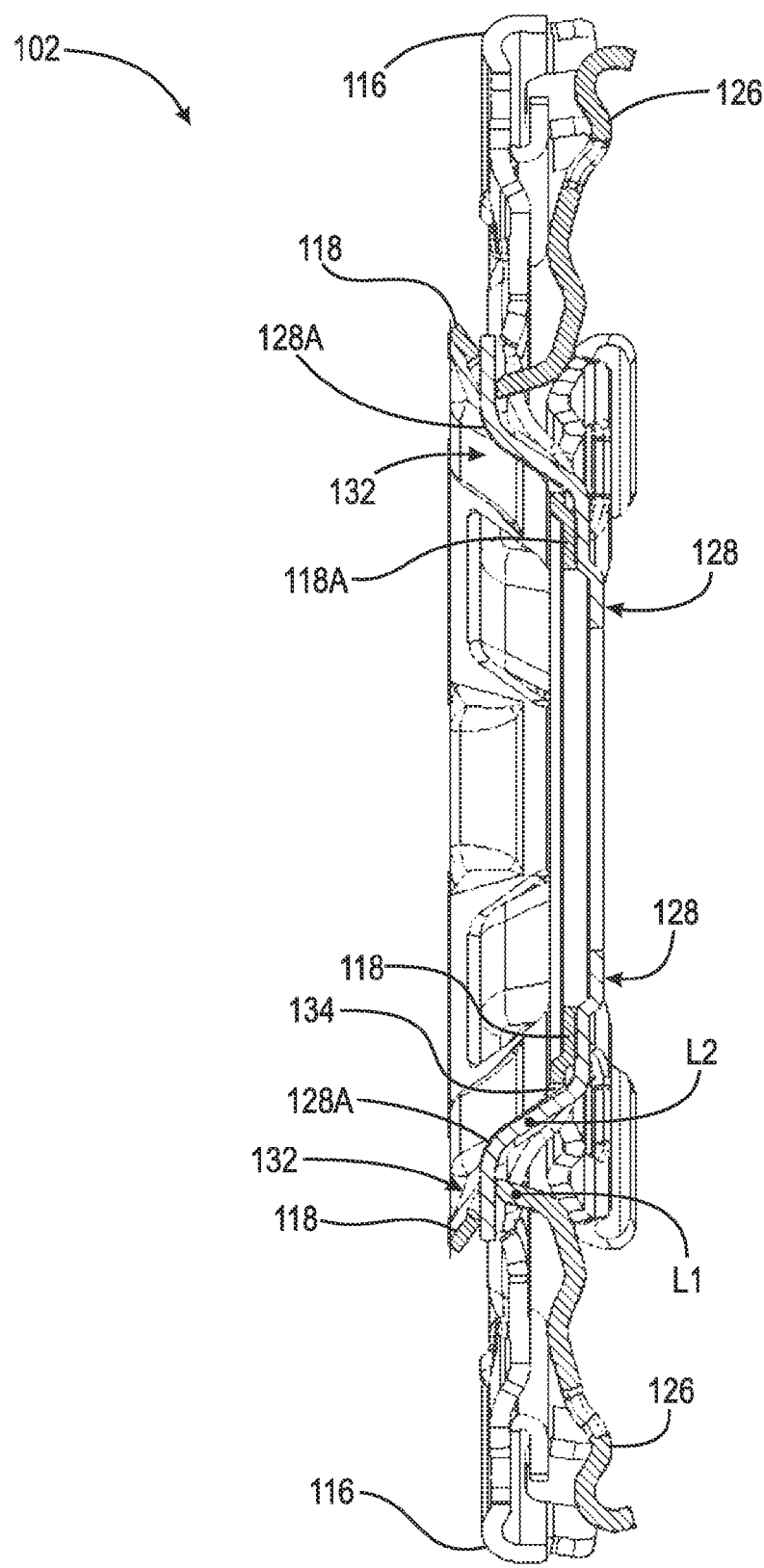
FIG. 8 is a cross-sectional view taken generally along line 8-8 in FIG. 6.
Figure 9:
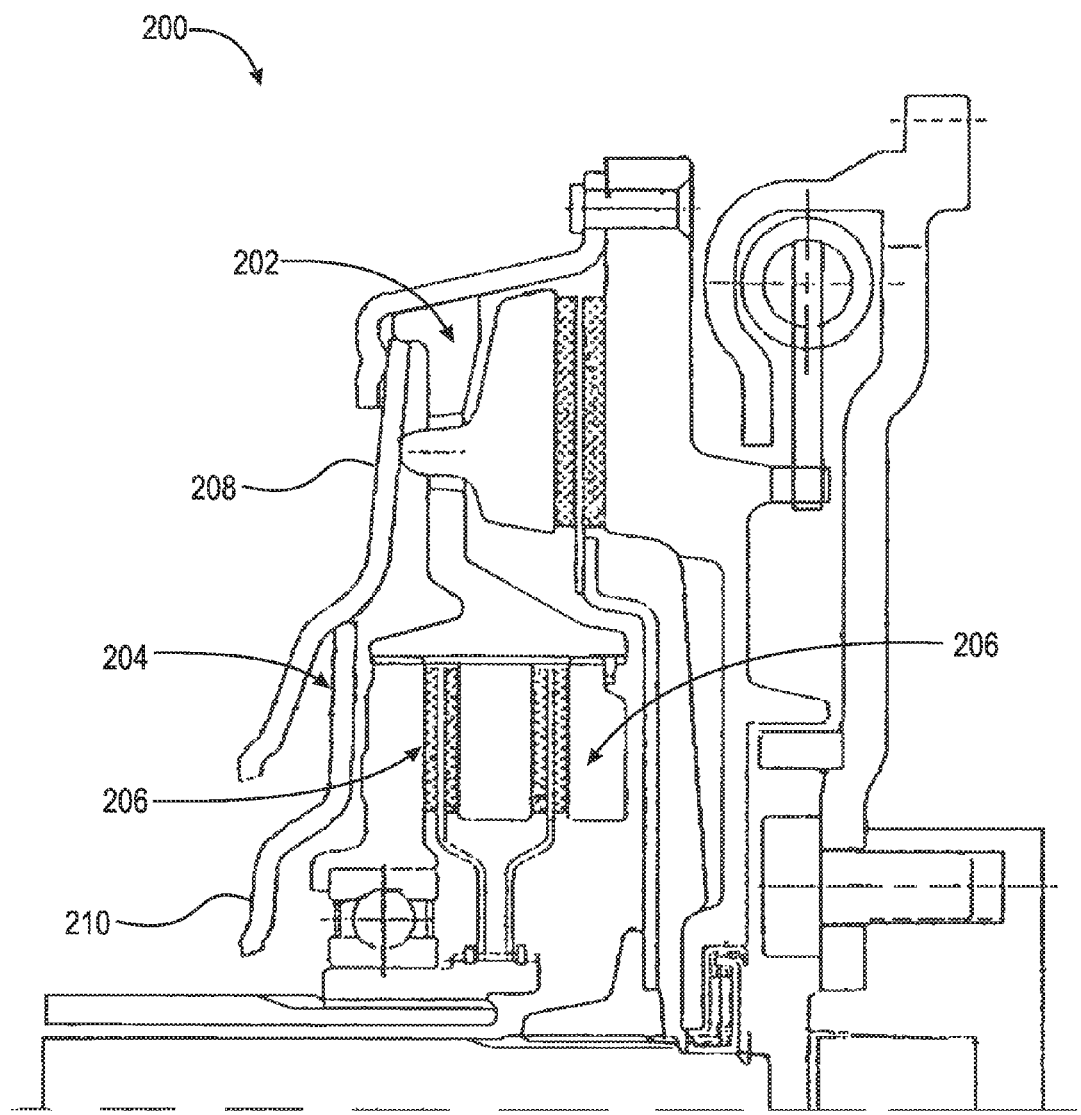
FIG. 9 shows a known double clutch.

FIG. 8 is a cross-sectional view generally along line 8-8 in FIG. 6. The following should be viewed in light of FIGS. 2 through 8. At least portions of levers 116 and 126 are aligned in circumferential direction CD, for example, such that line L1 in circumferential direction CD passes through levers 116 and 126. In an example embodiment, respective levers 116 and 126 alternate in the circumferential direction. As further described below, respective levers 116 and 126 are axially displaceable with respect to each other to open and close clutches 106 and 108, respectively. In an example embodiment, at least portions 116A of levers 116 are located radially outward of levers 126. In an example embodiment, portions 116B and 126A of levers 116 and 126 are at a same distance D in radial direction RD from axis AR, and are circumferentially misaligned so that no line in direction CD passes through portions 116B and 126A.

Levers 116 and 126 are rotatable about axis AR and are independently actuatable to open and close clutches 106 and 108, respectively, while occupying a minimum of axial space due to the circumferential alignment and axial nesting of clutches 106 and 108.

For a closed position of clutch 106: backing plate 102, clutch plate(s) 112, and pressure plate 114 are non-rotatably connected and shims 118 and 128 are aligned so that line L2 in circumferential direction CD passes through shims 118 and 128. For the closed position of clutch 106, portions 118A and 128A, for shims 118 and 128, respectively, are aligned so that line L2 passes through portions 118A and 128A. Portions 118A and 128A alternate in circumferential direction CD.

In an example embodiment, portions 128A are protrusions extending from shim 128, generally in axial direction AD2, opposite axial direction AD1. Shim 118 includes openings 132 enclosed by material forming shim 118. Respective edges 134 formed by the material wholly surround openings 132. In the closed position for clutch 106, portions 128A are located in respective openings 132. In an example embodiment, openings 132 and pockets 134 are configured to advantageously increase stiffening of shim 118.

For an open position of clutch 106: pressure plate 114 is rotatable with respect to backing plate 102. In an example embodiment, shims 118 and 128 are circumferentially misaligned so that no line in direction CD passes through shims 114 and 126 when clutch 106 is in the open position. For a closed position of clutch 108: backing plate 102, clutch plate(s) 122, and pressure plate 124 are non-rotatably connected. In an example embodiment, shims 118 and 128 are circumferentially misaligned so that no line passes through shims 118 and 128 in direction CD, for example, in the closed position for clutch 108.

The circumferential alignment and axial nesting of shims 118 and 128 enable independent operation of clutches 106 and 108, respectively, while supporting the circumferential alignment and axial nesting of levers 116 and 126 and occupying a minimum amount of axial space.

Clutch 100 is axially oriented so that line L3, in axial direction AD1 or AD2 passes through backing plate 102 and respective portions of pressure plates 114 and 124, plates 112 and 122, and one of levers 116 or 126.

Actuators 120 and 130 can be any actuators known in the art. In an example embodiment, actuators 120 and 130 are hydraulic actuators and fluid pressure in chambers 136 and 138 displaces pressure plates 140 and 142, respectively, in direction AD1 to close clutches 106 and 108, respectively.

In an example embodiment, cover 110 is non-rotatably connected to backing plate 102, for example, by at least one fastener 144. Cover 110 is arranged to receive rotational torque. In an example embodiment, clutches 106 and 108 include hubs 146 and 148, respectively, non-rotatably connected to plates 112 and 122, respectively. Hubs 146 and 148 non-rotatably connect to shaft 150. Thus, when clutch 106 is closed, torque is transmitted from cover 110 to a shaft 150 through plate(s) 112 and hub 146, and when clutch 108 is closed torque is transmitted from cover 110 to shaft 150 through plate(s) 120 and hub 148.

In an example embodiment, clutch 100 includes damper 152 with input 154 arranged to receive rotational torque, output 156 non-rotatably connected to cover 110, and at least one spring 158 engaged with input 154 and output 156.

Advantageously, the circumferential alignment and axial nesting of levers 116 and 126 and shims 118 and 128 address the problem noted above related to reduction of the axial footprint for a double clutch. Further, the reduction of the axial requirement for the levers and shims enables the axial alignment of clutch plates 112 and 122. In particular, clutches plates 112 and 122 are located maximally outward in radial direction RD to increase the torque bearing capacity of clutches 106 and 108. Thus, clutch 100 addresses the problem noted above regarding the requirement for extra clutch plates for a radially inward clutch in a dual clutch arrangement.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:
1. A double clutch, comprising:
   a backing plate;
   a first clutch including:
      at least one first clutch plate;
      a first pressure plate;
      a first plurality of levers engaged with the first pressure plate;
      a first shim engaged with the first plurality of levers; and,
      a first actuator:
         engaged with the first shim; and,
         arranged to axially displace the first shim to close the first clutch; and,
   a second clutch including:
      at least one second clutch plate;
      a second pressure plate;
      a second plurality of levers engaged with the second pressure plate aligned with the first plurality of levers such that a first line in the circumferential direction passes through the first and second pluralities of levers;
      a second shim engaged with the second plurality of levers; and,
      a second actuator:
         engaged with the second shim; and,
         arranged to axially displace the second shim to close the second clutch, wherein respective levers included in the first and second pluralities of levers alternate in the circumferential direction.
2. The double clutch of claim 1, wherein respective levers included in the first and second pluralities of levers are axially displaceable with respect to each other.
3. The double clutch of claim 1, wherein at least a portion of the first plurality of levers is located radially outward of the second plurality of levers.
4. The double clutch of claim 1, wherein:
   for a closed position of the first clutch:
      the first pressure plate, the at least one first clutch plate, and backing plate are non-rotatably connected; and,
      the first and second shims are aligned so that a second line in the circumferential direction passes through the first and second shims.
5. The double clutch of claim 1, wherein:
   for a closed position of the first clutch:
      the first pressure plate, the at least one first clutch plate, and backing plate are non-rotatably connected;
      first and second pluralities of portions, for the first and second shims, respectively, are aligned so that a second line in the circumferential direction passes through the first and second pluralities of portions; and,
   portions from the first and second pluralities of portions alternate in the circumferential direction.
6. The double clutch of claim 1, wherein:
   the first shim includes a plurality of openings enclosed by material forming the first shim; and,
   wherein for a closed position of the first clutch:
      the first pressure plate, the at least one first clutch plate, and backing plate are non-rotatably connected; and,
      a plurality of portions of the second shim are located in the plurality of openings.
7. The double clutch of claim 1, wherein for an open position of the first clutch:
   the first pressure plate is rotatable with respect to the backing plate; and,
   the first and second shims are circumferentially misaligned so that no line in the circumferential direction passes through the first and second shims.
8. The double clutch of claim 1, wherein for a closed position of the second clutch:
   the second pressure plate, the at least one second clutch plate, and backing plate are non-rotatably connected; and,
   the first and second shims are circumferentially misaligned so that no line in the circumferential direction passes through the first and second shims.
9. The double clutch of claim 1, wherein respective portions of the at least one first clutch plate and the first pressure plate are aligned with respective portions of the at least one second clutch plate and the second pressure plate in an axial direction so that a first line in an axial direction passes through the respective portions.
10. A double clutch, comprising:
   a backing plate;
   a first clutch including:
      at least one first clutch plate;
      a first pressure plate;
      a first plurality of levers engaged with the first pressure plate;
      a first shim engaged with the first plurality of levers and including a plurality of openings wholly enclosed by material forming the first shim; and, a first actuator:
  engaged with the first shim; and,
  arranged to axially displace the first shim to close the first clutch; and, a second clutch including:
at least one second clutch plate;
a second pressure plate;
a second plurality of levers engaged with the second pressure plate;
a second shim engaged with the second plurality of levers; and,
a second actuator:
  engaged with the second shim; and,
  arranged to axially displace the second shim to close the second clutch, wherein for a closed position of the first clutch:
the first pressure plate, at least one first clutch plate, and backing plate are non-rotatably connected; and,
respective portions of the first and second pluralities of levers are aligned such that a first line in a circumferential direction passes through the respective portions of the first and second shims.

11. The double clutch of claim 10, wherein:
for the closed position of the first clutch, the respective portions of the second shim are located in the plurality of openings.

12. The double clutch of claim 10, wherein the respective portions of the second shim and respective openings from the plurality of openings alternate in the circumferential direction.

13. The double clutch of claim 10, wherein the respective portions of the second shim and the plurality of openings are aligned such that a second line in the circumferential direction passes through the respective portions of the second shim and the plurality of openings.

14. The double clutch of claim 10, wherein for a closed position of the second clutch:
  the second pressure plate, the at least one second clutch plate, and backing plate are non-rotatably connected; and,
  the first and second shims are circumferentially misaligned so that no line in the circumferential direction passes through the first and second shims.

15. The double clutch of claim 10, wherein a second line in the circumferential direction passes through the first and second pluralities of levers.

16. The double clutch of claim 15, wherein respective levers included in the first and second pluralities of levers alternate in the circumferential direction.

17. The double clutch of claim 16, wherein at least a portion of the first plurality of levers is located radially outward of the second plurality of levers.

18. A double clutch, comprising:
a backing plate;
a first clutch including:
  at least one first clutch plate;
  a first pressure plate;
  a first plurality of levers engaged with the first pressure plate;
  a first shim engaged with the first plurality of levers and including a plurality of openings wholly enclosed by material forming the first shim; and,
  a first actuator:
    engaged with the first shim; and,
    arranged to displace the first shim in a first axial direction to close the first clutch; and,
a second clutch including:
  at least one second clutch plate;
  a second pressure plate;
  a second lever engaged with the second pressure plate and aligned with the first plurality of levers such that a first line in a circumferential direction passes through the first and second pluralities of levers;
  a second shim engaged with the second lever and including a plurality of portions; and,
  a second actuator:
    engaged with the second shim; and,
    arranged to displace the second shim in the axial direction to close the second clutch, wherein for a closed position of the first clutch:
the first pressure plate, the at least one first clutch plate, and the backing plate are non-rotatably connected; and,
the plurality of portions are disposed within the plurality of openings such that a second line in the circumferential direction passes through the plurality of portions and the plurality of openings.

* * * * *